INVENTORS
Jaroslav Prochazka
Josef Landau
František Souhrada

United States Patent Office 3,488,037
Patented Jan. 6, 1970

3,488,037
APPARATUS FOR CONTACTING AT LEAST TWO FLUID PHASES
Jaroslav Prochazka, Josef Landau, and Frantisek Souhrada, Prague, Czechoslovakia, assignors to Ceskoslovenska akademie ved, Prague, Czechoslovakia
Filed Apr. 12, 1968, Ser. No. 720,887
Claims priority, application Czechoslovakia, Apr. 21, 1967, 2,914/67
Int. Cl. B01f 13/00, 15/02
U.S. Cl. 259—4    11 Claims

ABSTRACT OF THE DISCLOSURE

A device for contacting at least two fluid phases. It comprises a substantially cylindrical vessel in an upright position with at least two mechanical carrier systems, each carrying a set of trays. The trays of each set are stationary with respect to each other but movable as a whole with respect to the other set. A tray of one set on one of the carrier systems alternates with a tray of another set on another carrier system. Each tray may be provided on its lower side with an extension tube terminated by a directing body and its circumference is at least partly elastically sealed against the wall of the vessel.

BACKGROUND OF THE INVENTION

Field of the invention

The invention relates to a device for the direct contact of at least two fluids differing from each other by their density and which are imperfectly miscible.

The device in accordance with the invention comprises a vertical vessel having for example the shape of cylinder provided with inlets and outlets for admitting and discharging fluids and at least with two sets of horizontal trays arranged one above the other and provided with holes, the trays of a given set being rigidly connected with each other and the trays of different sets alternating in the vertical direction and at least one set of trays being movable reciprocatively and excluding the case of an identical reciprocating movement of adjacent trays.

The device in accordance with the invention may be used for separating liquid mixtures by extraction or for absorption. It may also be used as a reactor for carrying out chemical reactions in heterogeneous fluid systems.

Description of the prior art

It is generally known that in some columns it is possible to affect favourably the transfer of mass or heat or mass and heat between different phases treated in the columns by reciprocative movement of internal constructional parts. In devices of this type, particularly in devices designed for extraction, all trays are subjected to an equal vibrational movement. But such a design is disadvantageous because the operation of adjacent trays is unfavourably affected. The object of the vibrational movement of the trays is a periodical increase in pressure on one side of the tray and a reduction in pressure on the other side of the tray. But if adjacent trays move in the same direction, one of the adjacent trays acts towards an increase in the pressure of the liquid between adjacent trays, but the second tray has a completely opposite effect, so that the final result of the process is not very high.

SUMMARY OF THE INVENTION

It is the general object of the invention to eliminate the mentioned drawbacks of the known state of the art.

Stated briefly but more specifically, the apparatus according to this invention a constructional arrangement in which the amplitude and or phase and or frequency of the reciprocating motions of adjacent trays are different.

Another specific object of the invention is an apparatus comprising a vessel in which there are located at least two rods to which trays are attached, to be referred to as carrier rods. The trays are carried by these rods in such a manner that the carrier rod to which trays forming one set are attached passes through cut-outs or holes in the trays forming another set, and the carrier rod to which the trays forming the other set are attached passes through cut-outs or holes in trays forming the first set of trays.

According to a specific feature of the invention the trays are provided on their lower side with extension tubes.

According to another feature of the invention there is attached under the lower opening of the extension tube a directing body having the shape of a plate so that the flow area between the lower end of the tube and the directing body forms at least one half and at the utmost twice the cross-sectional area of the passage of the continuous phase.

According to a further feature of the invention the lower end of the extension tube is closed by a bottom and the tube envelope is provided with discharge holes having a total area equal to at least one half and of the utmost twice the cross-sectional area of the passage for the continuous phase.

According to still another feature of the invention there is arranged at least on one half of the part of the circumference of the tray which rests against the wall of the vessel a resilient packing, for example a hollow ring.

The invention makes use of the fact that the drawbacks of existing devices can be eliminated by means of a device in which a substantial part of the trays performs in the perpendicular direction a vibrational movement in the course of which their distances from adjacent trays is changed. This change in the distance between adjacent trays during vibration can be achieved in various manners. For example, adjacent trays may vibrate at a different amplitude, or the vibration of adjacent trays may be phase shifted with respect to each other, or the trays may vibrate at a different frequency, or all these methods of movement may be variously combined. It is also possible to variously combine and alternate vibrating and stationary trays in the design of such a device. It is found that the operation of adjacent trays is favourably affected by such arangements.

BRIEF DESCRIPTION OF THE DRAWINGS

The objects of the invention and its various features and advantages will be best understood from the following specification to be read in conjunction with the accompanying drawings explaining the fundamental principle of the operation of the invention and preferred embodiments thereof. In the drawings.

BRIEF DESCRIPTION OF THE PREFERRED EMBODIMENTS

If one considers two sets or groups of trays alternately arranged above each other, it is possible to combine amplitude, frequency and phase of vibrational movements by means of which one obtains during vibration a variable distance between the vibrating trays with respect to adjacent trays.

Seven cases may occur as shown in Table I.

TABLE I

Possible combinations of parameters of vibrational movements of trays in the case of a system of two groups of trays:

Combinations (d = different, e = equal)

|  | AA | BB | CC | DD | EE | FF | GG |
|---|---|---|---|---|---|---|---|
| Amplitude | d | d | e | e | e | d | d |
| Frequency | d | e | d | e | d | e | d |
| Phase | d | e | e | d | d | d | e |

Figure 6:
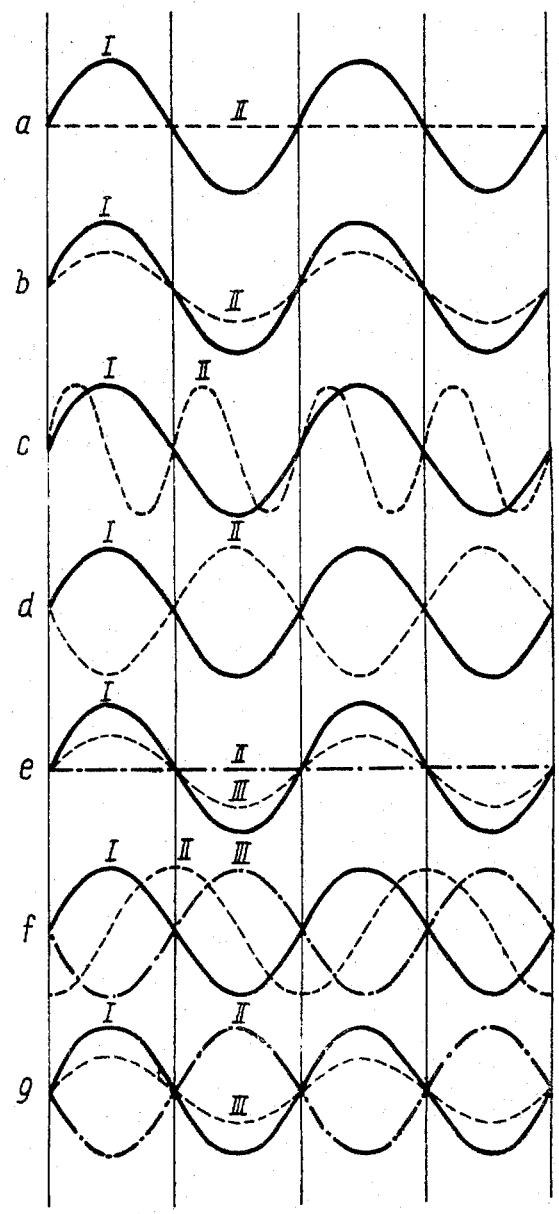
FIG. 6 shows in form of graphs the conditions which prevail in four combinations of amplitude, frequency and phase of reciprocating movements in the case of two trays which are arranged one above the other.

The first four cases are illustrated in FIG. 6.

Reference character a in FIG. 6 represents combination AA, that is the development of a process in which one group of trays I performs a vibrational movement and the other group of trays II is stationary. The two groups differ in amplitude, frequency and phase.

Character b in FIG. 6 represents combination BB. Both groups I and II are moving at different amplitudes. Their frequencies and phases are the same.

Character c in FIG. 6 represents combination CC. The two groups of trays I and II have the same amplitudes and phases, but their frequencies are different.

Character d in FIG. 6 represents combination DD. The phase of the movement of the two groups of trays I and II is different, but their frequencies and amplitudes are the same.

Using for example combination DD, and considerating three consecutive trays, it can be seen that the first and second tray approach each other, while the second and third tray move away from each other. Consequently, in the space between the first and second tray, under effect of these trays, the pressure is increased. In the space between the second and third tray the pressure is reduced, again due to the effect of these two trays. In comparison with hitherto known processes in which all trays move in the same manner, the process in accordance with the invention leads for the same amplitude and frequency of the vibrations of the two groups of trays to an increase in the driving forces which cause pumping and dispersion of phases. During the actual working process the supplied energy is of course used more effectively. Such an arrangement is also advantageous from the mechanical point of view for the following reasons:

(1) The driving constructional elements are loaded uniformly;

(2) The periodic variation in the pressure in the column is reduced due to the fact that the pressure effects of the individual trays are not added together; and (3) The vibrational movement does not cause vibration of the column because the resulting force transferred upon the column by means of pull rods is zero, for the duration of the vibration.

These advantages are particularly important in devices having large dimension. If the vessel contains a system of three sets of trays, the number of possible combinations of the mentioned parameters of the vibrational movements is substantially larger.

Referring now more particularly to FIG. 6, it should be understood that characters e, f and g in FIG. 6 show three examples of such combinations. Character e shows a case in which one group of trays marked II is stationary, while two other groups of trays marked I and III differ from each other by their amplitudes, but their frequencies and phases are the same.

Character f shows a case in which all three sets of trays I, II and III perform vibrational movements differing only in their phase, but their amplitudes and frequencies are the same.

Character g shows a case in which all three groups of trays I, II and III have the same frequency of movement, the movement of one pair of groups of trays I and III differing in their phases, the movements of the second pair of groups of trays I and III differing in their amplitudes and the movement of the third pair of groups of trays differing in their amplitudes and phases.

Compared against the case in which all trays perform the same vibrational movement, the process and device in accordance with the invention reduces also the tendency towards renewed intermixing of phases which reduces the efficiency of the device.

The described vibrational movement of the trays may be used for dispersion of imperfectly miscible liquids in various technological processes. The liquids which are to be brought into contact have to be led through device either in counter flow or in parallel flow. It should of course be understood that the vessel in which the said trays are located have to be provided with admission and discharge branches at their upper and lower end to make possible the required counter flow or parallel flow of the dispersed liquids with respect to the densities of the liquids. The vessel may further be provided at different places with further admission and discharge throats for further parallel flows and counter of liquid or gases.

Perforated trays may be designed in various manners. Very convenient are trays provided with special holes for the scattered dispersed phases and special passes for the continuous phase provided with a vertical flange on the side of the tray to which flows the dispersed phase. The phases for the continuous phase have a substantially larger cross-sectional area than the cross-sectional area of the individual holes for the dispersed phase. The passes for the continuous phase may be designed either as holes in the tray, or as a gap between the circumference of the tray or a part of the circumference of the tray and the wall of the vessel. Such simple passes for the continuous phase are, however, attended with the drawback that they facilitate renewed intermixing, particularly in the continuous phase. The invention is also concerned with the elimination of this drawback. This is achieved in that at the lower end of a tube for the passage of the continuous phase there is arranged a directing partition at such a distance that the discharge or flow area between the partition and the end of tube is at least one half and at the utmost twice discharge area for the continuous phase. The same effect may be obtained if the tube for the passage of the continuous phase is closed by a bottom and if the envelope of the tube is provided near its end with at least one hole. It should be understood that the partition may be attached either to some stationary part of the device or to a component performing a vibrational movement.

The efficiency of the device can be improved in that liquids are prevented from flowing through leaks between the wall of the vessel and the edge of the tray. This can be achieved as known, either by providing the circumference of the trays with a perpendicular flange, or by sealing the gap between the tray and the wall of the vessel with an elastic seal.

Figure 1:
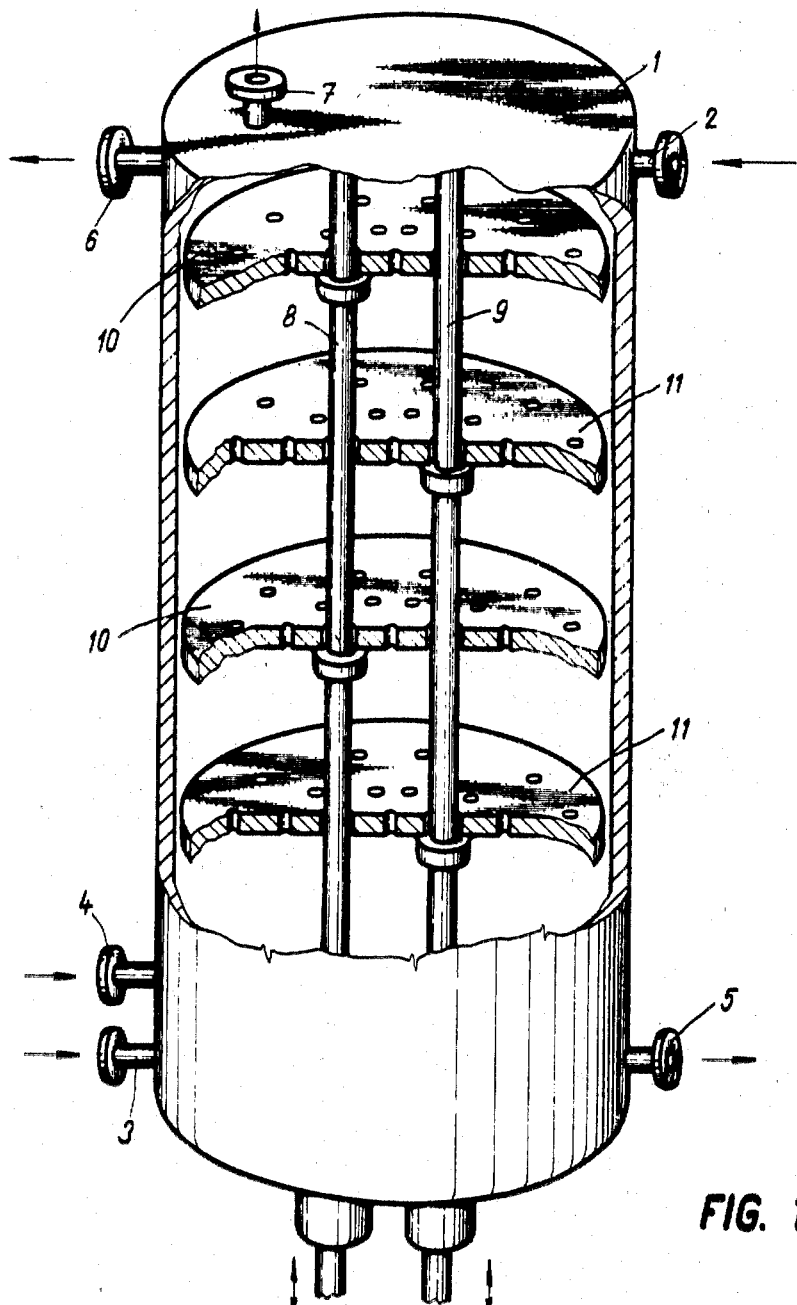
FIG. 1 illustrates an example of embodiment of a perpendicular cylindrical column comprising two carrying rods on each of which there is attached a group of trays.

FIG. 1 shows that the device in accordance with the invention comprises a cylindrical vertical vessel 1 provided with a first inlet 2 for a phase A, a second inlet B for a phase 3, and an inlet 4 for a phase C. The vessel is further provided with an outlet 5 for the phase A, an outlet 6 for the phase B, and an outlet 7 for the phase C. Two rods 8 and 9 for carrying each a group of trays are arranged reciprocatively movable inside the vessel 1 in parallel relationship. Reciprocating means for reciprocating the rods 8 and 9 in the sense indicated by the arrows associated with them is shown in diagrammatic form in FIG. 1, as well as in FIGS. 2 and 3. Rod 8 carries a group of trays 10 and rod 9 carries a group of trays 11. Rod 8 passes freely through holes in trays 11 attached to the second carrying rod 9 and rod 9 passes freely through holes in trays 10 attached to rod 8. Trays attached to one rod alternate with trays attached to the second rod.

Figure 2:
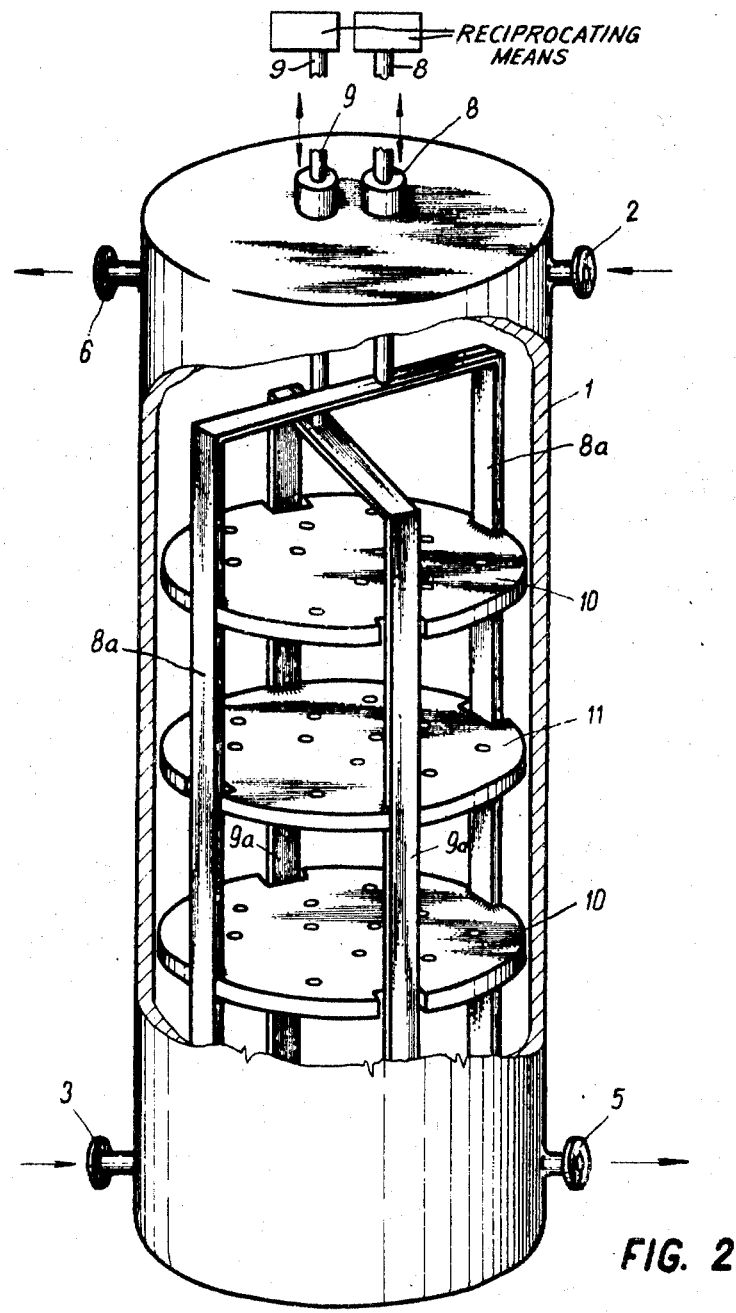
FIG. 2 represents another embodiment of a vertical cylindrical column with two carrying rods each comprising two arms in the shape of a reversed letter U, each tray being connected to both arms of one carrying twin rod so that a tray attached to one of the carrying twin rods always alternates with a tray connected to the other of the twin rods.

FIG. 2 illustrates a cylindrical vessel 1 with an inlet 2 for a phase A and an inlet 3 for a phase B, an outlet 5 for the phase A and an outlet 6 for the phase B. Inside the rod there are arranged rods 8a and 9a for carrying trays. Each rod consists of two arms forming a reversed letter U. On these rods are attached trays 10 and 11. Trays 10 are attached to the arms of rod 8a at two places and trays 11 are attached at two places to the arms of rod 9a. In trays 10 there are arranged at two places of the circumference cuttings-out through which pass the arms of the carrying rod 9a. In trays 11 there are also arranged at two places similar cuttings-out through which pass the arms of rod 8a. The trays 10 and 11 alternate in the vertical direction.

Figure 3:
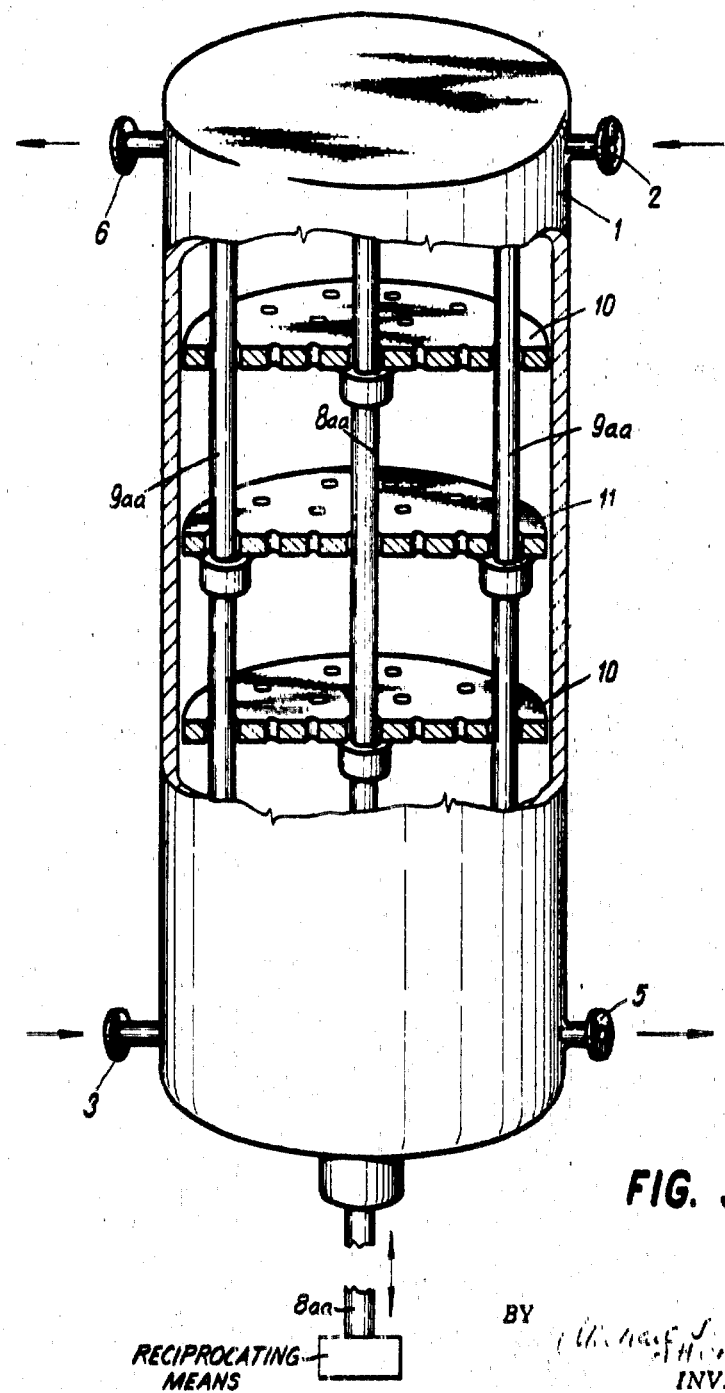
FIG. 3 shows another example of embodiment of a perpendicular cylindrical column comprising three carrying rods on which there are attached two groups of trays in such a manner that a tray the centre of which is attached to one rod alternates with a tray attached outside its centre to two carrying rods; in this case trays reciprocatively movable and attached on one rod alternate with stationary trays attached to two other stationary rods.

FIG. 3 shows a cylindrical vessel with an inlet 2 of a phase A and an inlet 3 of a phase B, outlet 5 of the phase A and outlet 6 of the phase B. Inside the vessel 1 there are arranged three carrying rods 8aa and 9aa on which there are attached perforated trays 10 and 11. Trays 10 are attached in their centres to a reciprocatively movable carrying rod 8a and trays 11 are attached at two places outside their centres to stationary rods 9aa. Rod 8aa passes through a central opening in trays 11 and carrying rods 9aa pass through two holes in tray tray 10 near their circumference.

Figure 5A:
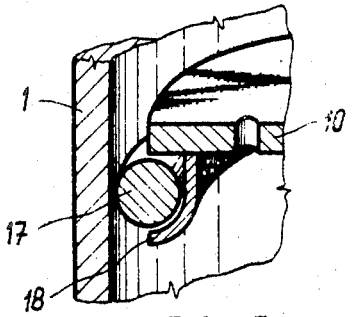
FIG. 5a illustrates an elastic sealing ring located in an outer ring.

One end of tube 12 shown in FIG. 5a is inserted into tray 10 and is provided under its lower mouth with a directing body 13 having the shape of a plate.

Figure 4A:
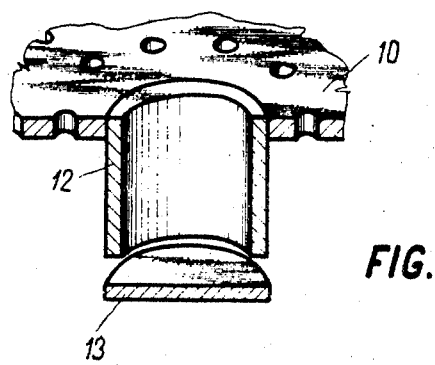
FIG. 4a illustrates a directing partition attached to a tray, the directing body having the shape of a plate.
Figure 4B:
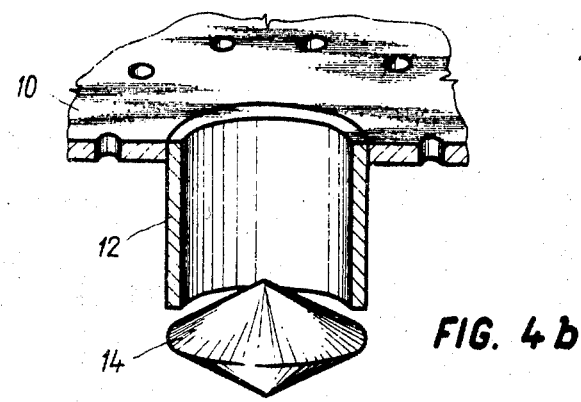
FIG. 4b illustrates another directing partition with a directing body having the shape of twin cones.

In FIG. 4b tube 12 is inserted with one end into a tray 10 and it is provided under its lower end with a directing body 14 having the shape of a twin cone.

Figure 4C:
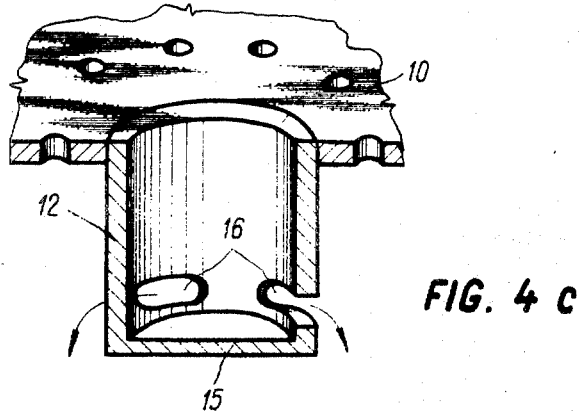
FIG. 4c illustrated still another directing partition having the shape of a closed tube.

In FIG. 4c tube 12 is inserted with one end into a tube 12 and it is closed at its other end by a bottom member 15. In the envelope of the tube 12 there are arranged discharge holes 16.

In FIG. 5a the edge of tray 10 is sealed against the wall of vessel 1 with an elastic metallic or non-metallic sealing ring 17 which is placed in a continuous collar or gripping member 18.

Figure 5B:
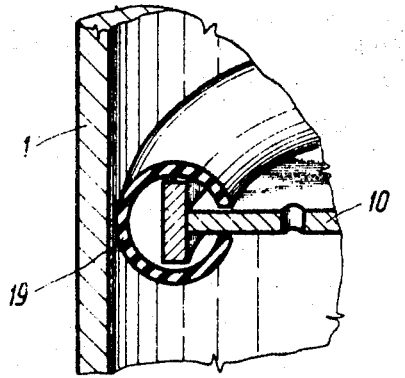
FIG. 5b is an elastic sealing ring placed over the outer edge of a tray.

In FIG. 5b using a similar principle of sealing the circumferential edge of tray 10 against the wall of vessel 1, the elastic sealing ring 19 is pulled over the outer edge of the tray. As shown in FIG. 5a the sealing ring 10 is split to allow to be pulled over the edge of the tray.

Figure 5C:
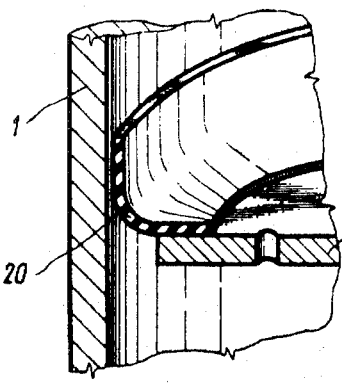
FIG. 5c shows the sealing of a tray by a collar.

In FIG. 5c the tray is sealed against the wall of vessel 1 by means of a collar or cuff 20 of elastic material which has a horizontal surface attached to the tray 10 and a vertical surface resting against the inner wall of the body 1 of the column.

Figure 5D:
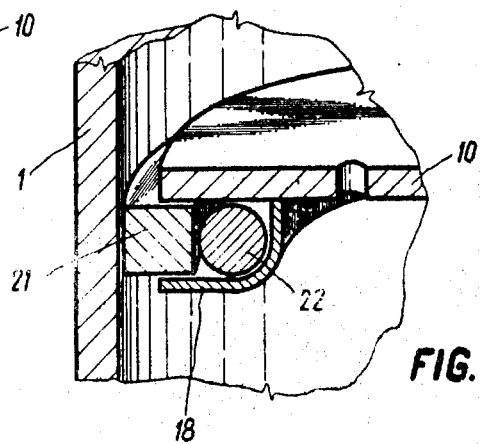
FIG. 5d illustrates the sealing of a tray by means of a ring pressed against the wall of the vessel by an elastic ring.

In FIG. 5d the tray is sealed against the wall of vessel 1 by means of a ring of soft material which is pressed against the inner wall of body 1 of the column by means of an elastic ring 22.

What is claimed is:

1. Apparatus for contacting at least two fluids, comprising an upright vessel having an axis; inlet and outlet means provided in said vessel for admitting fluids into and discharging fluids from said vessel; a plurality of first trays received in the interior of said vessel extending transversely of the axis thereof and being spaced from one another in the direction of said axis; a plurality of second trays received in the interior of said vessel extending transversely of said axis each of said second trays alternating in the direction of said axis with one of said first trays; connecting elements connecting said first trays so that the same constitute a first tray unit, and connecting second trays so that the same constitute a second tray unit; and means for imparting to at least one of said units a reciprocating movement in direction of said axis, said means being constructed and arranged so that at least one of the amplitude, phase or frequency of reciprocatory movement performed by each tray of said one unit with respect to the adjacent trays of the other units differs from that performed by the remaining trays of said one unit with respect to the trays of the other unit which are respectively adjacent to such remaining trays.

2. Apparatus as defined in claim 1, said vessel being vertical and said trays being horizontal.

3. Apparatus as defined in claim 1, said means also imparting an analogous reciprocatory movement to the other of said units.

4. Apparatus as defined in claim 3, said means comprising a plurality of aligned first openings, provided in the respective first trays and a plurality of second openings provided in the respective second trays aligned with one another but out of alignment with said first openings, and a pair of elongated rods one of which is fixed with the respective second trays and freely reciprocably extends through said aligned first openings and the other of which is fixed with the respective first trays and freely reciprocably extends through said aligned second openings.

5. Apparatus as defined in claim 1, the fluids in said vessel constituting a dispersed phase and a continuous phase; and first and second aperture means provided in said trays for passage of said dispersed phase and said continuous phase, respectively.

6. Apparatus as defined in claim 5, said second aperture means having a substantially larger cross-sectional area than said first aperture means.

7. Apparatus as defined in claim 5, said second aperture means comprising a plurality of second apertures; and further comprising a plurality of guide tubes each constituting an extension of one of said second apertures and extending downwardly from the tray in which such second aperture is provided and towards the next subjacent tray.

8. Apparatus as defined in claim 7, each of said guide tubes having a lower open end; and further comprising a phase-directing baffle mounted below and adjacent to the lower open end of each of said guide tubes.

9. Apparatus as defined in claim 8, wherein said baffle is a plate defining with the lower end of the associated tube a discharge aperture having a cross-sectional area equal to at least one-half and at most twice the cross-sectional area of the second aperture with which the respective tube is associated.

10. Apparatus as defined in claim 7, each of said guide tubes having a closed lower end and a circumferential wall provided in the region of said lower end with a plurality of perforations whose combined cross-sectional area is equal to at least one-half and at most twice the cross-sectional area of the second aperture with which the respective tube is associated.

11. Apparatus as defined in claim 1, said vessel having a circumferential wall and said trays having respective circumferential marginal portions proximal to said circumferential wall; and further comprising elastic sealing means sealingly connecting the respective trays with said wall and extending at least over one-half the circumference of the respective marginal portions.

References Cited

UNITED STATES PATENTS

| | | | |
|---|---|---|---|
| 2,615,692 | 10/1952 | Muller | 259—113 |
| 2,667,407 | 1/1954 | Fenske | 259— 27 X |
| 3,074,786 | 1/1963 | Duthie | 259— 27 X |
| 3,206,172 | 9/1965 | Gaska | 259— 27 |

ROBERT W. JENKINS, Primary Examiner.

U.S. Cl. X.R.

259—112, 113